United States Patent

Peck et al.

[11] Patent Number: 5,223,760
[45] Date of Patent: Jun. 29, 1993

[54] WHEEL SPEED SENSOR FOR DRIVE AXLE

[75] Inventors: David E. Peck; William D. Martin; Glen E. Swanson, all of Rochester Hills, Mich.

[73] Assignee: Rockwell International Corporation, Pittsburgh, Pa.

[21] Appl. No.: 785,243

[22] Filed: Nov. 4, 1991

Related U.S. Application Data

[63] Continuation of Ser. No. 463,737, Jan. 12, 1990, abandoned, which is a continuation-in-part of Ser. No. 236,689, Aug. 26, 1988, abandoned.

[51] Int. Cl.$^5$ .................. H02K 16/00; H02K 19/21; G01P 3/48
[52] U.S. Cl. .................. 310/168; 310/68 B; 310/114; 310/181; 324/174
[58] Field of Search .............. 310/67 R, 68 B, 75 C, 310/168, 169, 171, 181, 114, 268; 324/173, 174, 207.15, 173, 174, 207.15; 361/236, 238, 240, 243, 245, 236, 238, 240, 243, 245; 180/179; 475/220, 221

[56] References Cited

U.S. PATENT DOCUMENTS

| | | | |
|---|---|---|---|
| 3,489,935 | 1/1970 | Hayes | 310/168 |
| 3,500,091 | 3/1970 | Jones | 310/181 |
| 3,515,920 | 6/1970 | Jones | 310/181 |
| 3,541,368 | 11/1970 | Jones et al. | 310/181 |
| 3,549,925 | 12/1970 | Johnson | 310/168 |
| 3,551,712 | 12/1970 | Jones | 310/168 |
| 3,571,640 | 3/1971 | Watt | 310/168 |
| 3,604,966 | 9/1971 | Liggett | 310/168 |
| 3,626,226 | 12/1971 | Pauwels | 310/168 |
| 3,649,859 | 3/1972 | Watt et al. | 310/168 |
| 3,652,886 | 3/1972 | Riordan et al. | 310/168 |
| 3,710,158 | 1/1973 | Bachle et al. | 310/168 |
| 3,745,392 | 7/1973 | Phoenix et al. | 310/168 |
| 3,769,533 | 10/1973 | Pauwels | 310/168 |
| 3,772,549 | 11/1973 | Cumming | 310/168 |
| 3,772,550 | 11/1973 | Anselmino | 310/168 |
| 3,786,336 | 1/1974 | Lohr | 310/156 |
| 3,826,933 | 7/1974 | Anselmino | 310/168 |
| 3,887,046 | 6/1975 | Buelev | 310/168 |
| 3,916,234 | 10/1975 | Stigall et al. | 310/168 |
| 3,936,684 | 2/1976 | Anselmino et al. | 310/168 |
| 3,947,712 | 3/1976 | Burckhardt et al. | 310/168 |
| 4,492,906 | 1/1985 | Goto et al. | 310/68 B |
| 4,785,242 | 11/1988 | Vaidya et al. | 310/68 B |
| 4,862,025 | 8/1989 | Dierker, Jr. et al. | 310/168 |
| 4,862,028 | 8/1989 | Dierker, Jr. et al. | 310/168 |
| 4,953,670 | 9/1990 | Chemelewski | 310/168 |

FOREIGN PATENT DOCUMENTS 1381501  1/1975  United Kingdom ............ 310/168

Primary Examiner—Steven L. Stephan
Assistant Examiner—C. LaBalle
Attorney, Agent, or Firm—Nies, Kurz, Bergert & Tamburro

[57] ABSTRACT

An axially compact rotational sensor adaptable to a drive axle for determining the rotational speed of the differential case which is the average speed of the wheels associated therewith. In a second embodiment dual rotational sensors are incorporated in the drive axle for determining the rotational speed of the differential and one axle shaft permitting calculation of the speed of both axle shafts.

31 Claims, 4 Drawing Sheets

WHEEL SPEED SENSOR FOR DRIVE AXLE

BACKGROUND OF THE INVENTION

This application is a continuation of application Ser. No. 07/463,737 filed Jan. 12, 1990 which is a continuation-in-part of application Ser. No. 07/236,689, filed Aug. 26, 1988 now abandoned.

FIELD OF THE INVENTION

This invention relates to a wheel speed sensor for a drive axle and, more specifically a wheel speed sensor for incorporation in an axle requiring minimal modification thereof.

DESCRIPTION OF THE RELATED ART

An automotive traction control or adaptive braking system requires intelligence of the speed of the wheels of the vehicle. Existing systems use sensors which require extensive modification to existing drive axles. An example is U.S. Pat. No. 3,769,533 which incorporates circumferentially spaced gear teeth formed n the external surface of the differential case and the axle shaft. These teeth interact with an electromagnetic pickup which is carried in an aperture formed in the axle housing. Extensive modification of the axle housing is required to adapt the magnetic pick-up. In addition, any magnetizable contaminants which may be present in the lubricating oil of the axle are drawn to the magnetic pickup producing a continuous buildup which ultimately results in a magnetic shunt causing system failure. Finally, when electromagnetic pickups are located proximate one another so as to gather wheel speed data in the manner described in U.S. Pat. No. 3,769,533, magnetic interference between pickups results in erroneous signals regarding wheel speeds.

SUMMARY OF THE INVENTION

The present wheel speed sensor improves upon prior art speed sensors by utilizing an axially compact design to permit efficient adaptation to existing axles while requiring a minimum of modification. The present speed sensor includes a rotor and a stator, each having teeth defining slots, in conjunction with an annular magnet to increase and decrease magnetic flux in the magnetic circuit. Such a structure permits measurement of rotational speed in accordance with the increase and decrease of magnetic flux. The changes in flux generated by the rotor system induces an alternating voltage in a coil of wire in a well known manner to produce signals representative of rotational speed.

Two applications are disclosed. In the first, a single speed signal corresponding to the average speed of both axle shafts is produced by a single sensor which determines the speed of the differential case. In the second, dual signals which may be used to determine the actual speed of each axle shaft are produced by dual sensors each providing a signal which corresponds with one axle shaft speed and the speed of the differential case.

DESCRIPTION OF THE PREFERRED EMBODIMENTS

The preferred embodiment of the present invention includes an annular rotational speed sensor incorporated into an axle housing. An example of a suitable sensor is indicated generally at 10 in FIG. 1.

The sensor is mounted in stationary bore 12, and is driven by rotating shaft 14. Electrical leads 16 come from an internal sensing coil. The details of construction of any one of the embodiments of a rotational speed sensor which may be used in the present invention are described in now abandoned application Ser. No. 07/236,689, filed Aug. 24, 1988 and continuations following therefrom.

Figure 2:
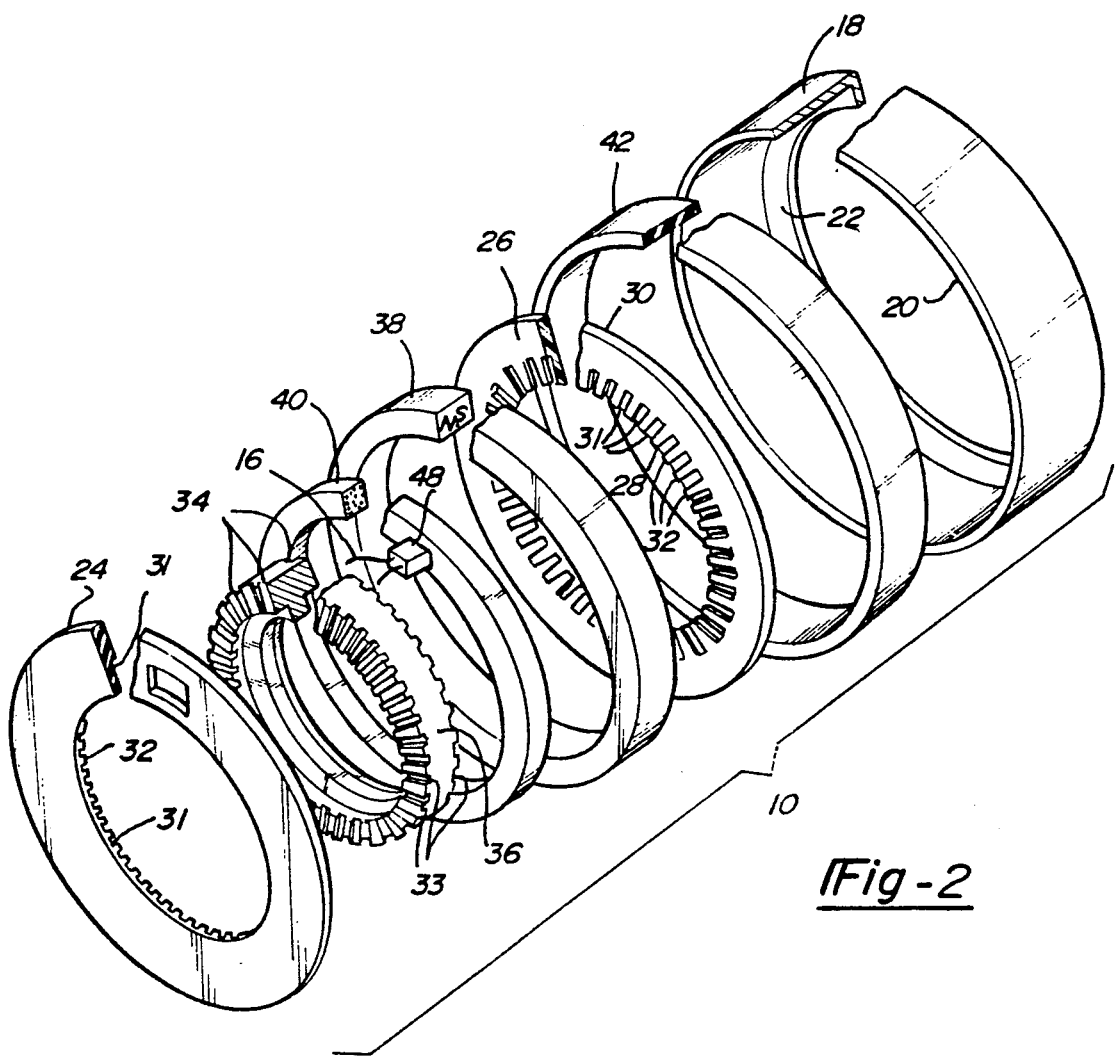
FIG. 2 is an exploded view of the sensor shown in FIG. 1.

As shown in FIG. 2, the components of the sensor telescope into sensor retainer 18 from the left edge thereof. Edge 20 is rolled over to cooperate with lip 22 in retaining the sensor components within retainer 8. The double-lipped design shown in FIG. 2 is merely one example of suitable retaining means that may be used on sensors incorporated in the present invention. A variety of other retaining means may be used, including adhesives. Annular stator elements 24 and 26 provide a closed magnetic path for magnetic flux extending from inner edge 28 to outer edge 30. Circumferentially spaced, radially disposed teeth 32 and slots 31 are formed on the inner faces of stator elements 24 and 26, and act in conjunction with corresponding teeth 34 and slots 33 formed in rotor 36 to provide the means for sensing rotational speed. Axially poled annular magnet 38 provides magnetic flux for sensor 10. A sensing coil, shown encapsulated at 40, consists of a simple multiturn winding having an axis coincident with the axis of the assembled sensor. Lead wires 16 extend from the two ends of coil 40 to connect the alternating voltage representing rotational speed signals to an external signal processing unit (not shown).

In this exemplary embodiment, rotor 36 is driven by shaft 14. Rotor 36 nests within coil 40, and the rotor-coil combination nests coaxially within magnet 38. This assembly in turn is located coaxially with and between stator elements 24 and 26.

Figure 1:
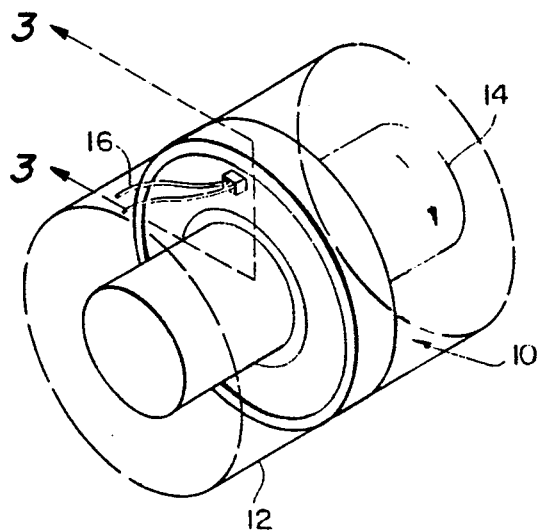
FIG. 1 is a perspective view of a typical rotary sensor which may be used with the present invention.
Figure 3:
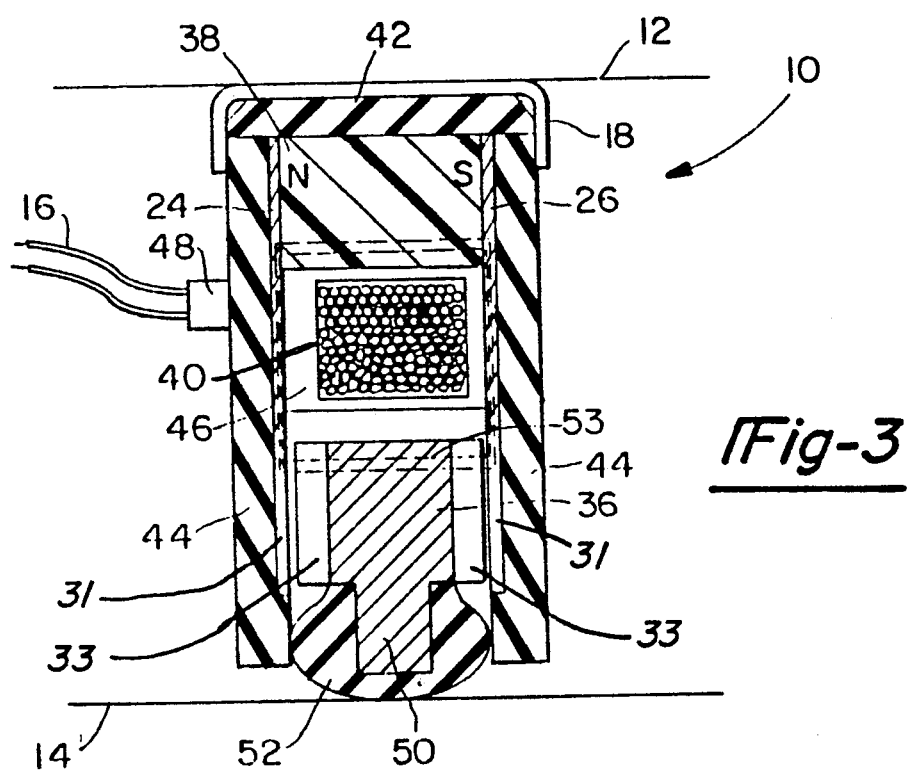
FIG. 3 is a sectional view taken along III—III of the sensor shown in FIG. 1.

FIG. 3 is a sectional view of the sensor shown in FIG. 1. In this view, the nesting relationship of rotor 36, coil 40 and magnet 38 is shown. Stator elements 24 and 26 are relatively thin members, made of, for example, 22 gauge 1010 steel. In the design shown, the stator elements 24 and 26 are backed by a layer of a non-magnetic material such as injection-molded plastic, as indicated at 44. Cooperating lips of retainer 18 may be used to retain the sensor components therein. This particular cross section of the stator elements 24 and 26 shows a slot at 31 in each stator element. Teeth and slots in the stator elements may be formed by a variety of methods including stamping or etching. In the final construction, slots 31 are preferably filled with backing material 44. Filling the slots presents a smooth continuous surface on the inner face of each stator element, so that if the rotor 36 rubs against it no damage will occur. Coil 40 is shown encapsulated by bobbin 46. Connections to the ends of coil 40 are made by lead wires 16, which exit through strain relief 48 on bobbin 46. Stator element 24 and backing material 44 are provided with an opening to allow strain relief 48 to pass therethrough. Rotor 36 is slightly thinner than the space between the stator elements 24 and 26 to provide axial running clearance, and the outer diameter of rotor 36 is less than the inner diameter of coil 40 to provide radial clearance.

Several techniques can be used to fabricate rotor 36. For example, rotor 36 may be a one-piece element, or may comprise two halves oriented with outwardly-facing teeth to operate in the same manner as the one-piece rotor. The rotor is preferably encapsulated in plastic or other suitable material (for example, backing material 44) such that slots 33 are filled flush offering a flat profile.

Hub 50, shown on the inside diameter of rotor 36, retains elastomeric ring 52. Ring 52 serves four functions. First, it provides a friction drive between shaft 14 and rim 50 of rotor 36. Second, it provides vibration isolation of the rotor relative to its driving member. Third, the area of contact between stator elements 24, 26 and ring 52 provides a running seal to keep contaminants out of the magnetic flux path and away from the moving parts of sensor 10. Fourth, compression of the ring at the stator element sealing surface provides a centering force for rotor 36, tending to keep the rotor from contacting the stator elements 24 and 26.

Friction drive of the rotor via ring 52 is the preferred drive means for the rotational speed sensor; other drive means, however, including tangs or keys engaging slots on the rotating shaft, could also be used, with or without a seal.

A closed toroidal magnetic flux path 53 (which prevents magnetizable containments from being attracted to the sensor) is thus established around coil 40 and proceeds axially from one face of magnet 38 to one adjacent stator element, radially through the stator element, axially into rotor 36 and out of rotor 36 into the other stator element, and finally radially through this second stator element and back into magnet 38. As rotor 36 rotates, the rotor and stator teeth 34 and 32 move into and out of juxtaposition to alternately decrease and increase the magnetic reluctance of the magnetic path. The change in reluctance increases and decreases the magnetic flux in the magnetic path. This change in flux generates a voltage in coil 40 in accordance with known principles. The output voltage on leads 16 will be an alternating voltage with an amplitude proportional to the speed of rotation, and a frequency equal to the speed of rotation times the number of teeth in 360 degrees.

Figure 4:
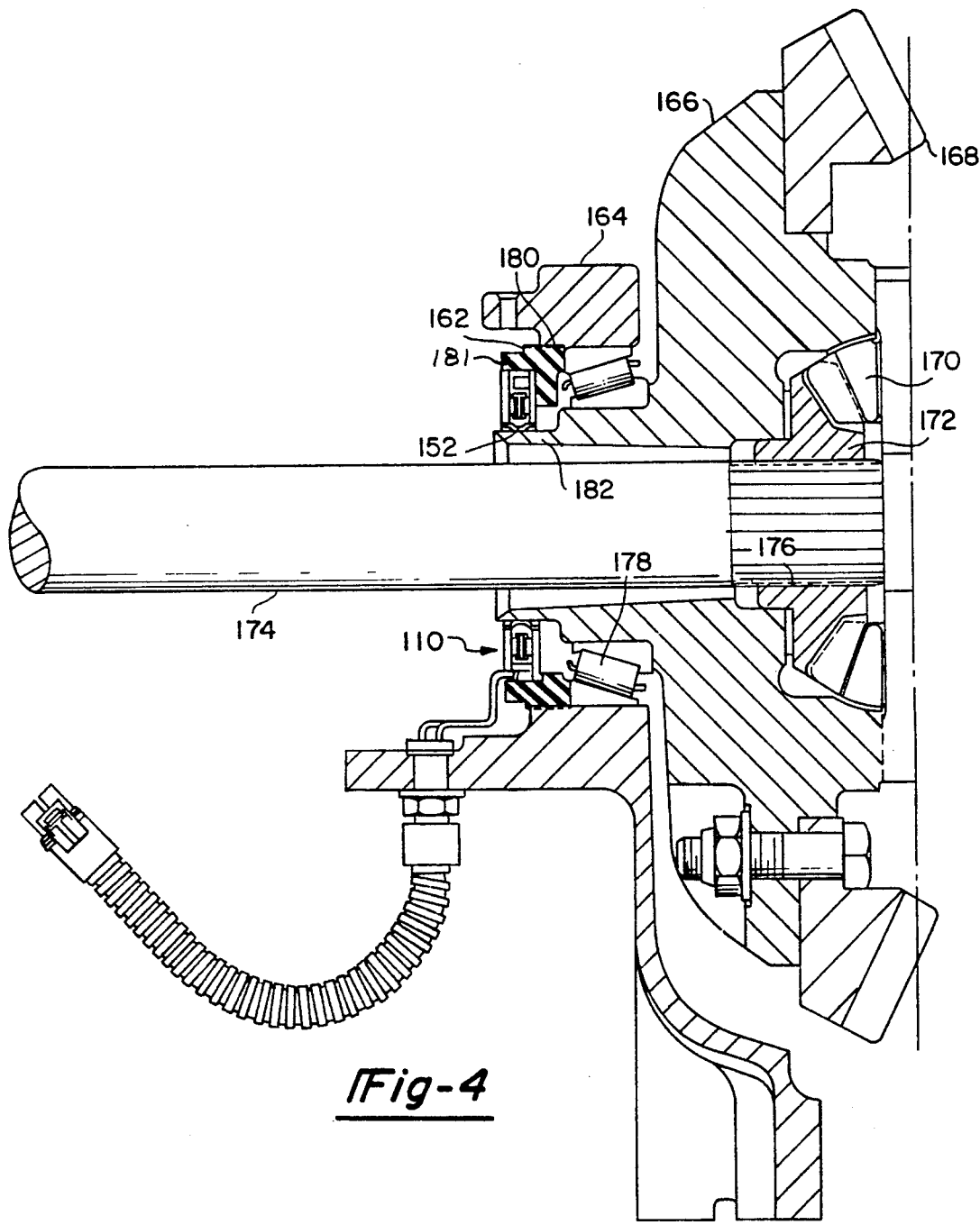
FIG. 4 is a view of the sensor shown in FIG. 3 mounted in a differential case adjusting ring to measure differential case speed.

One application for a flat, compact speed sensor such as the present invention is for measurement of wheel speed in a driving axle of a vehicle. FIG. 4 shows a sensor 110 nested within a differential case adjusting ring 162. Axle carrier 164 is stationary, and connected to a vehicle through the suspension system. Differential case 166 carries a ring gear 168 and is rotatable driven by a pinion. Differential case 166 also carries differential side gears 170 and 172, which turn axle 174 through cooperating splines 176.

Tapered roller bearing 178 and a similar bearing (not shown) on the other side of axle shaft 174 allow differential case 166 to rotate freely. Adjusting ring 162 and a similar ring on the other end of axle shaft 174 retain and position differential case 166 through the tapered roller bearings 178 in the axle carrier 164. Adjusting ring 162 is externally threaded as seen at 180 and screws into the stationary axle carrier 164. By means of the two adjusting rings, ring gear 168 is properly positioned relative to the drive pinion. The adjusting rings have castellations 181 which are used to lock the position of the respective adjusting ring with a key or pin. Flanged portion 182 on differential case 166 extends out between adjusting ring 162 and axle shaft 174.

Speed sensor 110 and adjusting ring 162 are sized for a light press fit of sensor 110 into adjusting ring 162. An adhesive may also be used for a more secure fit. Elastomeric ring 152 slides over the outside of flange 182 on differential case 166. Flange 182 is long enough to protect sensor 110 from being damaged when axle shaft 174 is put into the axle assembly.

As mentioned previously, friction drive of the rotor via the elastomeric ring is the preferred drive means for the rotational speed sensor. Friction drive makes assembly easy, and it eliminates alignment problems associated with locking the rotor to the driving element. Tang drive is possible, but requires extremely close tolerances to avoid backlash, which could give erroneous speed signals.

Tang drive would be required, however, in certain circumstances where high drive torque required might be greater than the frictional torque produced by the friction drive means. In such a circumstance, a combination of friction drive and tang drive is preferred.

Sensor 110 thus measures the speed of rotation of the differential case. If the vehicle is not turning a corner, both differential case 166 and the wheels (not shown) are rotating at the same angular speed. If the vehicle is turning, the outside wheel turns faster than the inside wheel, and the differential case 166 turns at the average speed of the two wheels on that axle (assuming only two wheels on the axle). An antilock braking or traction control system can utilize the differential case speed to control the brakes on that axle.

Figure 5:
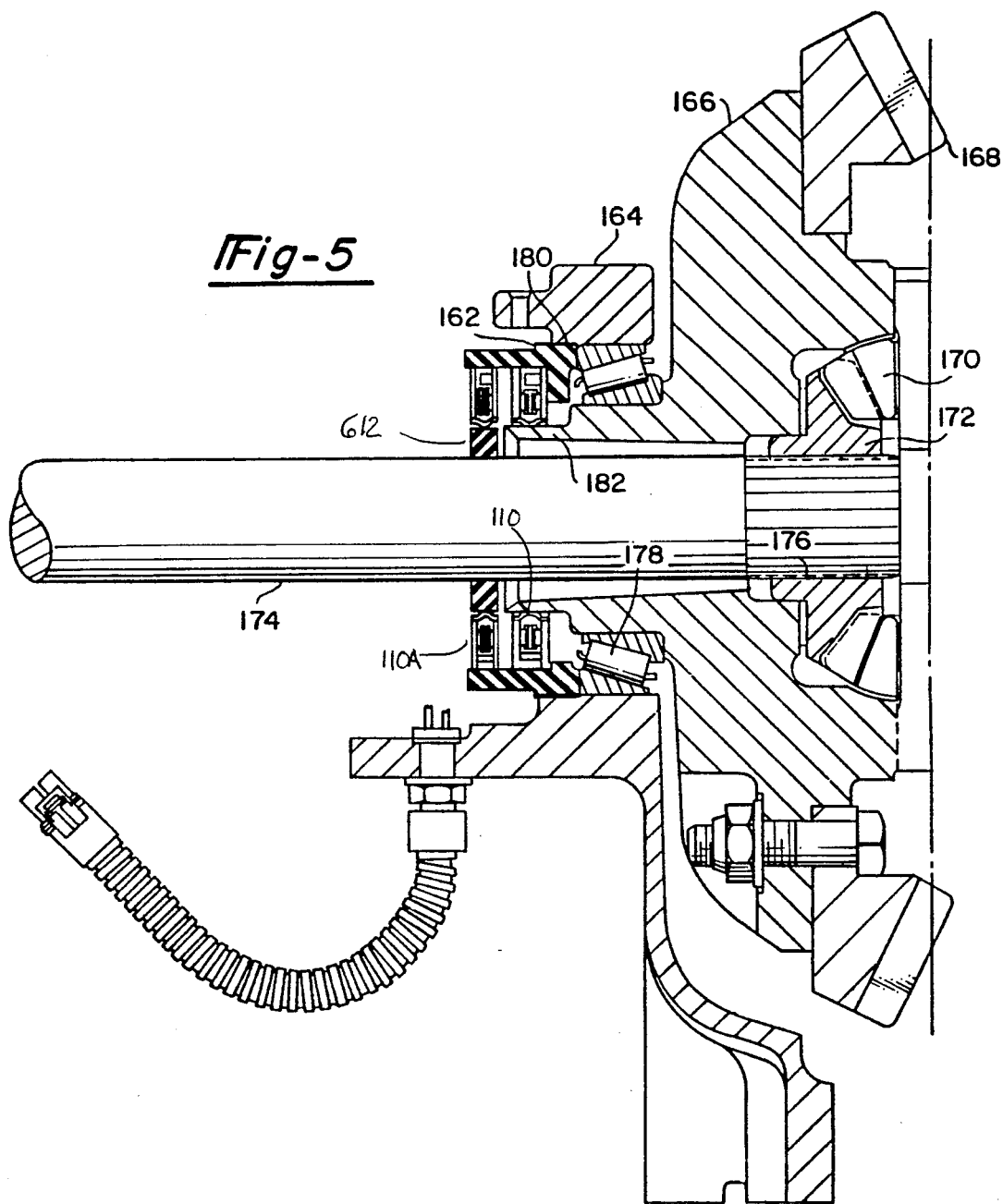
FIG. 5 is a view of dual sensors mounted in a differential housing driven by the differential case and an axle shaft.

The same basic concept can also be used for anti-skid braking control or traction control wherein the actual speed of both wheels or axle shafts on an axle is required. One arrangement of components to accomplish this task is shown in FIG. 5 which illustrates sensors 110 and 110A installed in a modified adjuster ring 162A which permits installation of both sensors on the same side of the axle. The first sensor 110 is installed as previously shown in FIG. 4 and thereby measures the speed of rotation of the differential case which is turning at the average speed of the two axle shafts on that axle. The second sensor 110A is also installed in the modified adjuster ring 162A. The rotor of sensor 110A compliantly engages annular ring 612 which is secured to axle shaft 174 to accomplish frictional drive thereof. Thus, sensor 110A measures the speed of rotation of the axle shaft 174. Knowing one axle shaft speed and the average of the two axle shaft speeds, both axle shaft speeds may be determined by the formula; two times the average minus the known axle shaft speed equals the unknown axle shaft speed. Using this technique, a single sensor location on one side of the axle housing, is required. In addition, installation and maintenance of the sensor is simplified. A further simplification is accomplished by connecting the stators of the two sensor assemblies to achieve a single sensor assembly. Such an assembly could then be installed as one unit.

One skilled in the art will readily recognize that certain specific details shown in the foregoing specification and drawings are exemplary in nature and subject to modification without departing from the teachings of the disclosure. Various modifications of the invention discussed in the foregoing description will become apparent to those skilled in the art. All such variations that basically rely on the teachings through which the invention has advanced the art are properly considered within the spirit and scope of the invention.

We claim:

1. A rotational speed sensor system including a gearing system drivingly engaging first and second axle shafts having a rotatable differential case disposed in a stationary carrier, said differential case including a rotatable axially extending flange member and a normally nonrotatable adjusting ring arranged coaxially of said flange member and arranged to provide axial adjustment of the position of the differential case relative to said carrier, said speed sensor system further comprising; a first rotor element drivingly connected to said flange member and a second rotor element drivingly connected to one of said first and second axle shafts; said adjusting ring including an axial flange extending in a direction axially away from said differential case; a first and second stator element each connected to said adjusting ring axial flange and respectively disposed proximate said first and second rotor elements; first means for generating a first electrical signal indicative of the speed of rotation of said first rotor element relative to said first stator element and second means for generating a second electrical signal indicative of the speed of rotation of said second rotor element relative to said second stator element.

2. The rotational speed sensor system of claim 1 wherein said first and second respective rotor and stator elements form first and second closed magnetic flux paths wherein magnetizable contaminants are not attracted to said sensor.

3. The rotational speed sensor system of claim 1 wherein said first and said second stator elements are connected to provide a single sensor assembly.

4. The rotational speed sensor system of claim 1 wherein said second rotor is drivingly connected to an annular member disposed coaxially about said second axle shaft.

5. A rotational speed sensor including a gearing system having a rotatable differential case disposed in a nonrotatable carrier, said differential case including a first rotatable axially extending flange member and a normally nonrotatable adjusting ring arranged coaxially of said first flange member and arranged to provide axial adjustment of the position of the differential case relative to said carrier; said speed sensor further comprising; a rotor element connected to said first flange member for rotation therewith; said nonrotatable adjusting ring including a second axial flange member extending in a direction axially away from said differential case; a stator element connected to said second axial flange member; and means for generating an electrical signal indicative of the speed of rotation of said rotor element relative to said stator element.

6. A rotational speed sensor including a gearing system drivingly engaging an axle shaft having a rotatable differential case disposed in a stationary carrier, said differential case including a first rotatable axially extending flange member and a normally nonrotatable adjusting ring arranged coaxially of said first flange member and arranged to provide axial adjustment of the position of the differential case relative to said carrier, said speed sensor further comprising;
   a rotor element drivingly connected to said axial shaft;
   said adjusting ring including a second axial flange member extending outwardly from said differential case;
   a stator element connected to said second axial flange member and disposed proximate said rotor element; and
   means for generating an electrical signal indicative of the speed of rotation of said rotor element relative to said stator element.

7. The invention of claim 4 wherein said rotor element is drivingly connected to said axle shaft by means of friction drive achieved by engaging said rotor element with an elastomeric ring disposed on said axle shaft.

8. The invention of claim 4 wherein said rotor element is drivingly connected to said axle shaft by means of a tang engagement.

9. The invention of claim 4 wherein said stator element is connected to said second axial flange member by means of a light press fit.

10. The invention of claim 4 wherein said second axial flange member extending outwardly from said differential case is formed by extensions of castellations disposed on said adjusting ring.

11. A rotational speed sensor system including a gearing system drivingly engaging first and second axle shafts having a rotatable differential case disposed in a stationary carrier, said differential case bearingly supported in said stationary carrier, a first and second adjusting ring for retaining and positioning said differential case with respect to said stationary carrier, said speed sensor system further comprising;
   a first rotor element drivingly connected to said first axle shaft;
   a second rotor element drivingly connected to said second axle shaft;
   said first and second adjusting rings include axial flange members extending respectively outwardly from said differential case;
   first and second stator elements connected respectively to said first and second adjusting rings and disposed proximate respective of said first and second rotor elements; and
   first means for generating a first electrical signal indicative of the speed of rotation of said first rotor element relative to said first stator element and second means for generating a second electrical signal indicative of the speed of rotation of said second rotor element relative to said second stator element.

12. The invention of claim 11 wherein said axial flange members are formed by extensions of castellations disposed on said adjusting ring.

13. A rotational speed sensor system including a gearing system drivingly engaging first and second axle shafts having a rotatable differential case disposed in a stationary carrier, said differential case including a rotatable axially extending flange member and normally nonrotatable adjusting means arranged coaxially of said flange member to provide axial adjustment of the position of the differential case relative to said carrier, said speed sensor system further comprising a first rotor element drivingly connected to said flange member and a second rotor element drivingly connected to one of said first and second axle shafts; a first and second stator element each connected to said adjusting means and respectively disposed proximate said first and second rotor elements; first means for generating a first electrical signal indicative of the speed of rotation of said first rotor element relative to said first stator element and second means for generating a second electrical signal indicative of the speed of rotation of said second rotor element relative to said second stator element.

14. The rotational speed sensor system of claim 13 wherein said first and second respective rotor and stator elements form first and second closed magnetic flux paths wherein magnetizable contaminants are not attracted to said sensor.

15. The rotational speed sensor system of claim 13 wherein said first and said second stator elements are connected to provide a single sensor assembly.

16. The rotational speed sensor system of claim 13 wherein said second rotor is drivingly connected to an annular member disposed coaxially about one of said first and second axle shafts.

17. The rotational speed sensor system of claim 13 wherein said first and second stator elements are annular in shape and are coaxially arranged around said first and second rotor elements.

18. The rotational speed sensor system of claim 13, said adjusting means including an adjusting ring, and said first and second stator elements being retained by said adjusting ring.

19. A rotational speed sensor including a gearing system having a rotatable differential case disposed in a nonrotatable carrier, said differential case including a rotatable axially extending flange member and normally nonrotatable adjusting means arranged coaxially of said flange member and arranged to provide axial adjustment of the position of the differential case relative to said carrier; said speed sensor further comprising a rotor element connected to said flange member for rotation therewith, a stator element connected to said adjusting means and disposed proximate to said rotor element, and means for generating an electrical signal indicative of the speed of rotation of said rotor element relative to said stator element.

20. The rotational speed sensor of claim 19, wherein said stator element is annular in shape and is coaxially arranged around said rotor element.

21. The rotational speed sensor of claim 19, said adjusting means including an adjusting ring and said stator element being retained by said adjusting ring.

22. A rotational speed sensor including a gearing system drivingly engaging an axle shaft and having a rotatable differential case disposed in a stationary carrier, normally nonrotatable adjusting means arranged coaxially of said axle shaft to provide axial adjustment of the position of the differential case relative to said carrier, said speed sensor further comprising a rotor element drivingly connected to said axle shaft, a stator element connected to said adjusting means and disposed proximate said rotor element, and means for generating an electrical signal indicative of the speed of rotation of said rotor element relative to said stator element.

23. The rotational speed sensor of claim 22 wherein said rotor element is drivingly connected to said axle shaft by means of friction drive achieved by engaging said rotor with an elastomeric ring disposed on said axle shaft.

24. The rotational speed sensor of claim 22 wherein said rotor element is drivingly connected to said axle shaft by means of a tang engagement.

25. The rotational speed sensor of claim 22, said adjusting means including an adjusting ring and said stator element being retained by said adjusting ring.

26. The rotational speed sensor of claim 25, wherein said adjusting ring includes an axially extending flange and said stator element is mounted within said flange.

27. The rotational speed sensor of claim 22, wherein said stator element is annular in shape and is coaxially arranged around said rotor element.

28. A rotational speed sensor system including a gearing system drivingly engaging first and second axle shafts and having a rotatable differential case disposed in a stationary carrier, said differential case bearingly supported in said stationary carrier, first and second adjusting means for positioning and retaining said differential case with respect to said stationary carrier, said speed sensor system further comprising:
 a first rotor element drivingly connected to said first axle shaft;
 a second rotor element drivingly connected to said second axle shaft;
 first and second stator elements connected respectively to said first and second adjusting means and respectively disposed proximate said first and second rotor elements; and
 first means for generating a first electrical signal indicative of the speed of rotation of said first rotor element relative to said first stator element and second means for generating a second electrical signal indicative of the speed of rotation of said second rotor element relative to second stator element.

29. The rotational speed sensor of claim 28, wherein each of said adjusting means includes an adjusting ring and each of said stator elements is retained by its respective adjusting ring.

30. The rotational speed sensor of claim 29, wherein each adjusting ring includes an axially extending flange and each stator element is mounted within the flange of its respective adjusting ring.

31. The rotational speed sensor of claim 28, wherein said stator elements are annular in shape and are coaxially arranged around said rotor elements.

* * * * *

UNITED STATES PATENT AND TRADEMARK OFFICE
CERTIFICATE OF CORRECTION

PATENT NO. : 5,223,760
DATED : June 29, 1993
INVENTOR(S) : DAvid E. Peck et al

It is certified that error appears in the above-indentified patent and that said Letters Patent is hereby corrected as shown below:

COLUMN 6:

Claim 7, line 15, change "4" to --6--.

Claim 8, line 20, change "4" to --6--.

Claim 9, line 23, change "4" to --6--.

Claim 10, line 26, change "4" to --6--.

Signed and Sealed this

Fifteenth Day of March, 1994

Attest:

BRUCE LEHMAN

Attesting Officer    Commissioner of Patents and Trademarks

UNITED STATES PATENT AND TRADEMARK OFFICE
CERTIFICATE OF CORRECTION

PATENT NO. : 5,223,760
DATED : June 29, 1993
INVENTOR(S) : David Peck et al

It is certified that error appears in the above-identified patent and that said Letters Patent is hereby corrected as shown below:

On title page, item [63] under "Related U.S. Application Data", change "Aug. 26, 1988" to --Aug. 24, 1988--.

Signed and Sealed this

Fourteenth Day of June, 1994

Attest:

BRUCE LEHMAN

Attesting Officer     Commissioner of Patents and Trademarks

UNITED STATES PATENT AND TRADEMARK OFFICE
CERTIFICATE OF CORRECTION

PATENT NO. : 5,223,760
DATED : June 29, 1993
INVENTOR(S) : David Peck, et al

Figure 7:
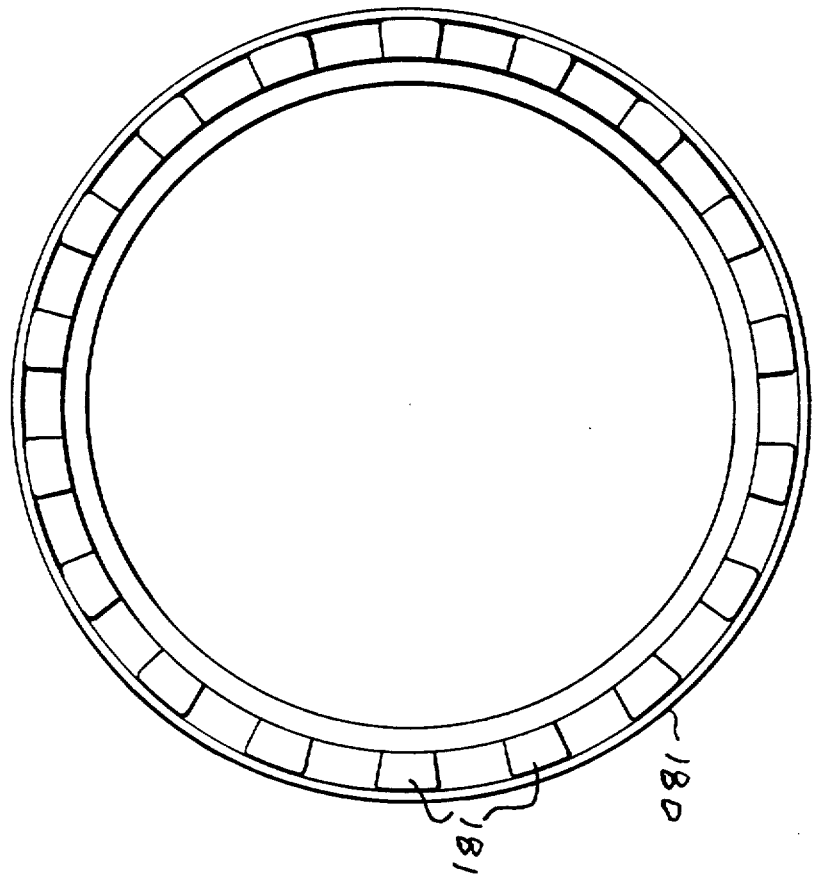
FIG. 7 is an end view of the adjusting ring taken along line 7—7 of FIG. 6.
Figure 6:
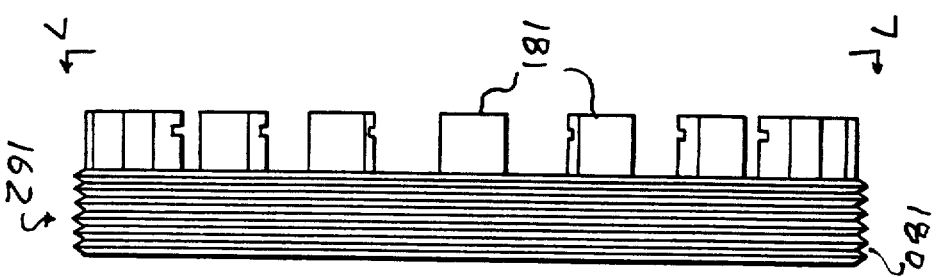
FIG. 6 is a side elevation view of the bearing adjusting ring having castellations.

It is certified that error appears in the above-indentified patent and that said Letters Patent is hereby corrected as shown below:

The drawing sheet, consisting of Figs. 6 and 7, should be added as shown on the attached page.

Signed and Sealed this

Twenty-sixth Day of July, 1994

Attest:

BRUCE LEHMAN

*Attesting Officer*     *Commissioner of Patents and Trademarks*